United States Patent [19]

Kawano

[11] Patent Number: 5,449,526
[45] Date of Patent: Sep. 12, 1995

[54] PROCESS FOR PRODUCING DIETARY FIBROUS FOOD

[75] Inventor: Nobuhisa Kawano, 36-15, Takadanobaba, 4-chome, Shinjuku-ku, Tokyo 160, Japan

[73] Assignees: Kabushikikaisha Mannan Ouyou Kaihatsu Kenkyusho; Nobuhisa Kawano, both of Tokyo, Japan

[21] Appl. No.: 137,191

[22] PCT Filed: Mar. 2, 1993

[86] PCT No.: PCT/JP93/00263

§ 371 Date: Mar. 17, 1994

§ 102(e) Date: Mar. 17, 1994

[87] PCT Pub. No.: WO93/17587

PCT Pub. Date: Sep. 16, 1993

[30] Foreign Application Priority Data

Mar. 4, 1992 [JP] Japan ................... 4-096108

[51] Int. Cl.$^6$ .................. A23L 1/314; A23L 1/317
[52] U.S. Cl. ......................... 426/574; 426/646
[58] Field of Search ............... 426/574, 644, 646, 412, 426/513

[56] References Cited

U.S. PATENT DOCUMENTS 4,876,103 10/1989 Kawano et al. .............. 426/574

FOREIGN PATENT DOCUMENTS

| 0310703 | 4/1989 | European Pat. Off. |
| 0319987 | 6/1989 | European Pat. Off. ............ 426/646 |
| 2638332 | 5/1990 | France . |
| 52-47948 | 4/1977 | Japan ................... 426/574 |
| 63-254962 | 10/1988 | Japan ................... 426/646 |

OTHER PUBLICATIONS

Patent Abstracts of Japan, vol. 014, No. 123 (C-0698), Mar. 8, 1990, JP-A-2000410, Jan. 5, 1990.
Patent Abstracts of Japan, vol. 014, No. 250 (C-0723), May 29, 1990, JP-A-2069164, Mar. 8, 1990.
Patent Abstracts of Japan, vol. 010, No. 377 (C-392), Dec. 16, 1986, JP-A-61170362, Aug. 1, 1986.

*Primary Examiner*—Arthur L. Corbin
*Attorney, Agent, or Firm*—Oblon, Spivak, McClelland, Maier & Neustadt

[57] ABSTRACT

A process wherein KONJAK mannan and minced meat are used as the main raw materials which comprises obtaining a hydrated gel of KONJAK mannan by making a coagulant act on a mixture of KONJAK mannan and water, mixing and kneading the hydrated gel and minced meat, forming the kneaded mixture into a desired shape, and freezing the shaped product, heating and freezing the shaped product, or retorting the shaped product whereby dietary fibrous food can be economically manufactured.

4 Claims, No Drawings

5,449,526

PROCESS FOR PRODUCING DIETARY FIBROUS FOOD

BACKGROUND OF THE INVENTION

TECHNICAL FIELD

The present invention relates to a dietary fibrous food produced by using KONJAK mannan and minced meat as the main raw material, which dietary fibrous food is excellent dietetically, organoleptically and in terms of physical properties.

BACKGROUND ART

KONJAK (Amorphophallus), a plant belonging to the family of Araceae, contains mannans, such as glucomannan, of polysaccharides in a high percentage in its corm. The mannans contained in the corm of KONJAK are generically referred to as KONJAK mannan.

An aqueous solution of KONJAK mannan gels when an alkaline compound (coagulant) such as $Ca(OH)_2$ is added thereto. As is well known, the produced gel becomes an irreversible elastic gel on heating, forming KONJAK jelly (Japanese "KONNYAKU") which is a traditional food of Japan.

By way of parenthesis, a process of producing this KONJAK jelly is described below: First, (a) KONJAK mannan and water are mixed in a ratio by weight of 1:35–40 and the mixture is stirred. Stirring is continued until the viscosity of the mixture elevates and the sediment of the KONJAK mannan particles disappears. Usually, about 15 minutes are required for this. Then, (b) the mixture is allowed to stand until the KONJAK mannan particles are moistened and swell up by absorbing water, for which usually about 40–120 minutes are required. This is the step generally referred to as Japanese "mebiraki" or swelling of KONJAK mannan. Next, (c) the thus obtained swollen substance (hydrate of KONJAK mannan) is acted on by a coagullant to form a hydrate gel. Finally, (d) this hydrate gel is molded into a desired shape with an appropriate size and then heated to form an irreversible elastic gel. This elastic gel is synonymous with KONJAK jelly. What is to be noted regarding the above process is that in order to let the coagulant act effectively, the KONJAK mannan particles are swollen previous to the action of the coagulant, and for attaining this, water, in turn, is added in a large quantity, such as about 35 parts by weight or more to one part by weight of KONJAK mannan. By so doing, pre-heating molding of the hydrate gel obtained by the action of a coagulant is made possible.

KONJAK mannan is a kind of dietary fiber, and wider use of this substance in the field of foods is desired from the dietetical standpoint. So far, however, its use has been mostly restricted to a main raw material for processed foods in the form of the minced or ground version of KONJAK jelly. It is known to use such hydrate gel obtained in the step (c) in the above-described KONJAK jelly producing process, without heating, as a subsidiary raw material for processed foods. However, there has not yet been reached the stage of positive use of said substance because a long-time process is required therefor, reproducibility still cannot be secured, and the peculiar disagreeable smell and high pH values above 10 are given to the resultant processed foods, which, in turn, constitutes insuperable negative factors for practical use of said substance.

For producing KONJAK jelly, as described above, KONJAK mannan is dissolved in a large amount of water, such as 35–40 parts by weight to one part by weight of KONJAK mannan, and this aqueous solution of KONJAK mannan is allowed to stand for about 40 minutes or more to effectuate swelling of the KONJAK mannan particles, then a coagulant is added thereto and the produced gel is heated.

In the attempts of utilization of various properties of KONJAK mannan in production of processed foods, a method for producting a flaky food by using mannan, in which water is used in amounts restricted to about half those in production of KONJAK jelly, such as preferably 15–25 parts by weight of water to one part by weight of KONJAK mannan, and which comprises dissolving KONJAK mannan, either singly or together with other subsidiary material(s), in water with stirring, adding a coagulant to form a paste-like mass, rolling out this pasty mass by passing it through pressure rolls, and solidifying it by heating, has been proposed by the same inventor of the present invention (refer to Japanese Patent Application Laid-Open (kokai) No. Hei 3-49652,i.e., JP-A-3-49652). In this method, however, rolling out with pressure rolls is essential, and the subsidiary materials shown as examples in its gazetted specification are some types of starch such as waxy starch and processed starch and protein such as whole egg powder. In this patent specification, no mention is made of any combined use of KONJAK mannan and minced meat, and no allusion is even made to the usage in the manners of the present invention. Also, the flaky food produced by the method disclosed in the above specification and the dietary fibrous food produced by the method of the present invention are totally different from each other.

SUMMARY OF THE INVENTION

The present invention has been completed in the course of further attempts of the present inventor for utilization of the properties of KONJAK mannan in production of processed foods.

Specifically, the present invention relates to a process for producing a dietary fibrous food which comprises mixing and kneading one part by weight of a hydrate gel obtained by making a coagulant in an effective amount act on a 1:10–25 (by weight) mixture of KONJAK mannan and water, and 0.3–1.5 parts by weight of minced meat, forming the kneaded mass into a desired shape and freezing it.

DETAILED DESCRIPTION OF THE INVENTION

In the following, the present invention will be described in detail.

KONJAK mannan, which is one of the main materials in the process of the present invention, is not subject to any specific restrictions; it may be the same as used in preparation of ordinary KONJAK jelly. That is, any type of KONJAK mannan produced from the corm of KONJAK can be used irrespective of the kind, preparation method, quality or such matters.

As for KONJAK mannan to water ratios in the mixture thereof which is to be acted on by a coagulant, water is 25 parts by weight or less, specifically 10–25 parts by weight, preferably 12–22 parts by weight, to one part by weight of KONJAK mannan. If the amount of water is too small, the hydrate becomes a hard gel whereby the state of equilibrium is not reached in mixing of KONJAK mannan with minced meat which is another main material, and the produced food is hard and unpalatable. On the other hand, if the amount of water is too large, the hydrate becomes sherbet-like and the produced food has a pulpy texture and tastes bad. Therefore, use of water in either too small or too large a quantity should be avoided.

The coagulant to be made to act on a mixture of KONJAK mannan and water is also not specifically defined in the present invention; it may be the same as used in production of KONJAK jelly. Certain alkaline compounds such as $Ca(OH)_2$, $Na_2CO_3$, $Na_2HPO_4$, and $NaHCO_3$ can be mentioned as typical examples of the coagulant. A coagulant may be used either singly or together with one or more different types of coagulants. Also, the coagulant may be used in the form of a solution or suspension with a concentration of about 0.8 to 2%. Water of the aqueous solution or suspension is counted in the water in the mixture of KONJAK mannan and water. The amount of the coagulant used is an effective one for the gel formation from a KONJAK mannan hydrate. That is, the coagulant is added not for the purpose of coagulating a mixture of such hydrate gel and minced meat, but for coagulating the hydrate at the spot where it exists mixed with minced meat and in the equilibrated state in the shaped mass, whereby clamminess peculiar to the KONJAK mannan hydrate is eliminated and the binding between the particles of minced meat is strengthened to make the resultant food taste palatable. In the case of $Ca(OH)_2$ for instance, it is used in an amount of 0.02–0.025 parts by weight per one part by weight of KONJAK mannan. If the amount of this coagulant is too small, it can not produce any desired coagulating action, while if its amount is too large, the pH value is elevated to a high level, such as 10 or above, which is unfavorable to the resultant foods. In this case, the unpleasant smell peculiar to KONJAK mannan remains and also degeneration in quality of minced meat is caused to reduce savor of the resultant prepared food. Therefore, addition of the coagulant in either too small or too large a quantity should be avoided.

There are no difficulties in obtaining a hydrate gel by making a coagulant act on a mixture of KONJAK mannan and water. A desired hydrate gel can be produced by, for instance, adding an aqueous solution or a suspension of a coagulant to a mixture of KONJAK mannan and water under stirring, followed by further stirring for an appropriate period of time, or by mixing KONJAK mannan, water and a coagulant all together, followed by stirring for a certain period of time. In this case, according to the present invention, the amount of water used can be reduced to 10–25 parts by weight per one part by weight of KONJAK mannan as mentioned above, and further the step for swelling KONJAK mannan can be avoided.

Minced meat, which is another main raw material in the process of the present invention, is also not particularly specified; it is possible to use any type of minced meat generally used as base material of hamburger steaks, meatballs, meat loaves and the like, such as minced beef, minced pork, minced chicken, minced horsemeat, minced mutton, minced guts, and the like is also possible to use a single type or two or more types of minced meat in admixture as desired.

Such minced meat is mixed and kneaded with a hydrate gel of KONJAK mannan prepared in the manner described above. No difficulties are involved in such mixing and kneading. It can be accomplished by using, for instance, an agitator or a food cutter. The mixing ratio is 0.3–1.5 parts by weight of minced meat per one part by weight of hydrate gel. If the amount of minced meat is below this range, the resultant food provides for no sufficient savor of meat, while if its amount is above said range, the effect of use of KONJAK mannan is prevented from manifesting itself to a satisfactory degree. Thus, minced meat should not be used in either too small or too large a proportion.

The kneaded mixture of a hydrate gel of KONJAK mannan and minced meat is formed into a desired shape, such as the shape of hamburger steak, the shape of meatball, the shape of meat loaf, or the like. Needless to say, in this shaping process, it is desirable to coat the surface of the shaped product with wheat flour, crumbs or the like in an amount of about 5 wt% or less of the shaped product as in the case of the shaping of hamburger steaks.

The thus prepared shaped product is frozen. No difficulties are involved in this freezing. It can be accomplished by selecting any pertinent method from the freezing methods usually employed for freezing foods, for example, quick freezing.

The thus produced frozen dietary fibrous food of the present invention is commercially circulated in the frozen state.

In such frozen food of the present invention, since minced meat remains is raw and the action of KONJAK mannan is yet to be realized, it needs heating before it is served for a meal. This heating can of course be effected in the same manner as practiced when a hamburger steak, meat ball, meat loaf or the like is offered to dining. Such heating may be performed after thawing the frozen food or directly on the frozen food without thawing it.

According to the present invention, a mixture of a hydrate gel of KONJAK mannan and minced meat, which has been formed into a desired shape, may be frozen after it has once been heated to bring the raw minced meat into an eatable state while allowing KONJAK mannan to develop its action, instead of being frozen directly as it is. The frozen dietary fibrous food of the present invention produced in this way is also commercially circulated in the frozen state.

The thus produced frozen food of the present invention is served on the table after it has been thawed, but it is of course better for the taste to serve it after warmed up.

In the above process, heating may be effected by a retort treatment, which can eliminate the ensuing freezing treatment. Thus, the present invention also pertains to a process for producing a retorted dietary fibrous food which comprises mixing and kneading one part by weight of a hydrate gel obtained by making a coagulant in an effective amount act on a 1:10–25 (by weight) mixture of KONJAK mannan and water, and 0.3–1.5 parts by weight of minced meat, forming the kneaded mixture into a desired shape, packing it into a retort pouch after or without saucing, and subjecting it to a retort treatment. Needless to say, the thus produced dietary fibrous food contained in a retort pouch can be commercially circulated at normal temperature.

According to the present invention, in the above-described processes of the present invention, there can be added to KONJAK mannan and minced meat as the main raw materials, an appropriate subsidiary material(s) within the limits not prejudicial to manifestation of the effect intended by the present invention if desired.

More specifically, in the hydrate of KONJAK mannan, there can be contained, if desired, as subsidiary material(s), one or more materials selected from water soluble polysaccharides such as starch and carragheenin, proteins such as powdered milk or milk (water contained therein is counted in the water in a mixture of KONJAK mannan and water), seasonings such as sugar, table salt, sodium glutamate, beef extract, hamburger spice, and the like, and also water-insoluble farina, fats and oils, protein powder such as egg powder, or the like, colorant, kelp meal and the like. Thus, for instance, such a desired subsidiary material is mixed with KONJAK mannan and water, and a coagulant is made to act on this mixture. The amount of the subsidiary material(s) added is up to about 2:2 parts by weight, in the case of the water-soluble materials, and up to about 1.5 parts by weight, in the case of the water-insoluble materials, per one part by weight of KONJAK mannan. Addition of the subsidiary materials in any greater amount may prove obstructive to generation of the action of KONJAK mannan.

When a hydrate gel and minced meat are mixed, there may be added as subsidiary material(s), if desired, one or more of such materials usually used in preparation of hamburger steaks, meatballs, meat loaves or the like, as onion, egg, crumbs, and the like. The amount of such subsidiary material(s) used is not particularly specified, and the amount thereof per one part by weight of minced meat may be the same as used in preparation of hamburger steaks and the like. Incidentally, the action of these subsidiary materials is the same as in hamburger steaks, and the like.

The details of the processes of the present invention are as described above. Hereinafter, the effects realized by the present invention will be illustrated.

The dietary fibrous food of the present invention, which is a minced meat processed food, is excellent dietetically since its calory and fat content can be reduced to less than $\frac{1}{3}$ of those of the conventional minced meat processed foods such as hamburger steak of the same weight, owing to use of KONJAK mannan as one of the main raw materials.

Also, since the amount of water in the KONJAK mannan/water mixture on which a coagulant is to be made to act is notably lessened as compared with the case of preparation of KONJAK jelly which is a traditional Japanese food, the elastic gel finally obtained after making a coagulant act on said mixture and heating it gives no sense of disagreeableness even though contained in the minced meat processed food of this invention, and therefore the minced meat processed food of this invention presents the same palatableness as the conventional hamburger steaks, and the like, produced without using KONJAK mannan. Thus, the minced meat processed food of the present invention is excellent organo-leptically.

The conventional minced meat processed foods produced without using KONJAK mannan, such as hamburger steaks, are reduced in size when heated for serving for a meal or by dripping when their frozen ones are thawed. In the case of the minced meat processed food of the present invention, however, such size reduction does not take place, and also the food has a resistance to freezing, so it is excellent in terms of physical properties.

The effect of the present invention can be not only seen in the products per se as described above but also observed in the process itself. That is, since KONJAK mannan is integrated with meat whereby meat particles are strongly bound to one another via the mannan gel, adjustment of the properties of an intermediate product in the production process becomes notably easy to make, which, in turn, leads to a marked improvement of workability and a reduction of time required for the production. Also, since the food of the present invention can be produced without using egg, onion, crumbs and the like, it is possible to reduce the production cost. Thus, the processes of the present invention are economically advantageous.

EXAMPLES

In the following, the present invention will further be illustrated with reference to the examples thereof.

EXAMPLE 1

To 32 g of KONJAK mannan, 2.4 g of wheat flour and 5.6 g of yolk powder (40 g in total) was added 2 g of madder pigment as colorant and mixed. Then, 560 ml of water (30° C.) was added thereto, followed by stirring for about 5 minutes. To the resulting mixture, a coagulant prepared by suspending 0.8 g of $Ca(OH)_2$ in 80 ml of water was added, and the mixture was stirred for about one minute and allowed to stand. After a while, that is, about 5 minutes later, there was produced a hydrate gel.

Then, 260 g of the thus obtained hydrate gel, 140 g of a 1:1 mixture of minced beef and pork, 12 g of granulated sugar, 4 g of hamburger steak spice, 4 g of beef extract and 2 g of sodium glutamate (422 g in total) were subjected to cutting and kneading (20 seconds) by a food cutter to an extent that the granularire sense of meat would not be lost, thereby obtaining a cohesive, paste-like kneaded meat mass.

Onion, egg and crumbs may be added in the course of kneading for adjustment of seasoning, but in the instant example, there was admitted no need of adding such materials in view of the purpose of their use, and they were not added.

Then, the thus obtained kneaded mass was divided into five portions, and each portion was rounded into an oval form (about 12 mm thick), sprinkled with crumbs and heated one side after another on a griddle over a slow fire for about 7 minutes to obtain a hamburger steak-like product having good integrity.

Lastly, the thus obtained hamburger steak-like product was quickly frozen under a condition of $-25°$ C. to obtain a frozen dietary fibrous food of the present invention.

EXAMPLE 2

To 35 g of KONJAK mannan, 7.5 g of waxy starch, 5 g of dextrin and 2.5 g of yolk powder (50 g in total), 0.85 g of $Ca(OH)_2$ was added and mixed in the powder state. To this powdery mixture, 630 ml of water at 20° C. was added, followed by stirring about 5 minutes later, when the mixture became pasty, it was kneaded by a rubber spatula for about 2 minutes and then allowed to stand for about 20 minutes to obtain a hydrate gel.

Then, 200 g of the thus obtained hydrate gel and 200 g of a 1:1 mixture of minced beef and port (400 g in total) along with 15 g of granulated sugar, 6 g of hamburger steak spice, 4 g of beef extract and 2 g of sodium glutamate (427 g in total) were subjected to cutting and kneading (for 15 seconds) by a food cutter to an extent that the granulative sense of meat would not be lost, thereby obtaining a kneaded mass having good integrity and a sense of roughly minced meat.

Then, the thus obtained kneaded mass was divided into six portions, and each portion was shaped into an oval form (about 12 mm thick), packed into a polyethylene bag and subjected to quick freezing under a condition of −21° C. to obtain a frozen dietary fibrous food of the present invention.

INDUSTRIAL APPLICABILITY

According to the present invention, it is possible to provide, in an economically advantageous way, a dietary fibrous food which is excellent dietetically, organoleptically and in terms of physical properties by using KONJAK mannan and minced meat as the main raw materials.

I claim:

1. A process for producing a frozen dietary fibrous food which comprises mixing and kneading one part by weight of a hydrated gel of KONJAK mannan and 0.3–1.5 parts by weight of minced meat to form a kneaded mixture, said hydrated gel of KONJAK mannan being prepared by mixing a coagulant, 1:10–25 parts by weight of water and 1 part by weight of KONJAK mannan to form a mixture and then stirring the mixture only for a time sufficient to avoid swelling of the KONJAK mannan and to form said hydrated gel of KONJAK mannan, forming the kneaded mixture into a desired shape and then freezing the shaped mixture.

2. A process for producing a frozen dietary fibrous food which comprises mixing and kneading one part by weight of a hydrated gel of KONJAK mannan and 0.3–1.5 parts by weight of minced meat to form a kneaded mixture, said hydrated gel of KONJAK mannan being prepared by mixing a coagulant, 10–25 parts by weight of water and 1 part by weight of KONJAK mannan to form a mixture and then stirring the mixture only for a time sufficient to avoid swelling of the KONJAK mannan to form said hydrated gel of KONJAK mannan, forming the kneaded mixture into a desired shape, heating and then freezing the shaped and heated mixture.

3. A process for producing a retorted dietary fibrous food which comprises mixing and kneading one part by weight of a hydrated gel of KONJAK mannan and 0.3–1.5 parts by weight of minced meat to form a kneaded mixture, said hydrated gel of KONJAK mannan being prepared by mixing a coagulant, 10–25 parts by weight of water and 1 part by weight of KONJAK mannan to form a mixture and then stirring the mixture only for a time sufficient to avoid swelling of the KONJAK mannan and to form said hydrated gel of KONJAK mannan, forming the kneaded mixture into a desired shape, packing the shaped mixture into a retort pouch after or without saucing, and subjecting the shaped and packed mixture to a retort treatment.

4. The process according to any one of claims 1 to 3, wherein conventional food additives are combined with the hydrated gel and minced meat.

* * * * *

UNITED STATES PATENT AND TRADEMARK OFFICE
CERTIFICATE OF CORRECTION

PATENT NO. : 5,449,526
DATED : September 12, 1995
INVENTOR(S) : Nobuhisa KAWANO

It is certified that error appears in the above-indentified patent and that said Letters Patent is hereby corrected as shown below:

Column 1, line 38, "coagullant" should read --coagulant--.

Column 5, line 41, "calory" should read --calorie--.

Column 6, line 36, "granularire" should read --granulative --.

Column 7, line 6, "1:10-25" should read --10-25--.

Signed and Sealed this

Sixth Day of August, 1996

Attest:

BRUCE LEHMAN

Attesting Officer

Commissioner of Patents and Trademarks